US008020106B2

(12) United States Patent
Diab et al.

(10) Patent No.: US 8,020,106 B2
(45) Date of Patent: Sep. 13, 2011

(54) INTEGRATION OF PERSONALIZED PORTALS WITH WEB CONTENT SYNDICATION

(75) Inventors: Ali Diab, Menlo Park, CA (US); David Ku, Palo AltoFremont, CA (US); Kevin Lee, East Palo Alto, CA (US); Qi Lu, Saratoga, CA (US); Eckart Walther, Palo Alto, CA (US); Benjamin Garrett, Santa Clara, CA (US); Scott A. Gatz, San Francisco, CA (US); Jason Douglas, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 702 days.

(21) Appl. No.: 11/082,128

(22) Filed: Mar. 15, 2005

(65) Prior Publication Data
US 2006/0230021 A1 Oct. 12, 2006

Related U.S. Application Data

(60) Provisional application No. 60/553,644, filed on Mar. 15, 2004.

(51) Int. Cl.
*G06F 3/00* (2006.01)
*G06F 7/00* (2006.01)
*G06F 17/00* (2006.01)
*G06F 17/30* (2006.01)

(52) U.S. Cl. ........ 715/760; 715/234; 715/733; 715/738; 707/706; 707/707; 707/709; 707/722; 707/729

(58) Field of Classification Search .................. 715/513, 715/234, 733, 738, 760; 707/706–710, 722, 707/729, 771
See application file for complete search history.

(56) References Cited

U.S. PATENT DOCUMENTS

| 5,640,522 | A | * | 6/1997 | Warrin ........................... 715/732 |
| 7,120,672 | B1 | * | 10/2006 | Szeto et al. .................... 709/206 |
| 7,200,820 | B1 | * | 4/2007 | Stephens ........................ 715/838 |
| 2002/0184195 | A1 | * | 12/2002 | Qian ................................. 707/3 |
| 2002/0194168 | A1 | * | 12/2002 | Min et al. ........................... 707/3 |
| 2003/0146939 | A1 | * | 8/2003 | Petropoulos et al. .......... 345/810 |
| 2004/0070605 | A1 | * | 4/2004 | Huang et al. ................... 345/744 |
| 2004/0162820 | A1 | * | 8/2004 | James et al. ....................... 707/3 |
| 2007/0130126 | A1 | * | 6/2007 | Lucovsky et al. ................. 707/3 |

OTHER PUBLICATIONS

Bloglines, Oct. 12, 2003, Trustic Inc, http://web.archive.org/web/20031012011958/http://bloglines.com/.*
Molly Montgomery, RSS Tutorial, Dec. 2003, The Lone Star Librarian, vol. 56:2, pp. 1-6.*

(Continued)

*Primary Examiner* — Tadeese Hailu
*Assistant Examiner* — Yongjia Pan
(74) *Attorney, Agent, or Firm* — Seth H. Ostrow; Ostrow Kaufman LLP

(57) ABSTRACT

Personal portal pages for individual users are integrated with web content syndication. For example, when a search query is received from the user, a list of hits is generated. For each hit, it is determined whether there is an associated syndication feed, such as an RSS feed. The list of hits is displayed for the user, and a syndication option is included for each hit that has an associated syndication feed. The user can select the syndication option and thereby subscribe their personal portal page to that syndication feed. In some embodiments, the user may also be able to select syndication feeds for subscription via an alternative interface.

27 Claims, 18 Drawing Sheets

OTHER PUBLICATIONS

Bloglines, Help: Frequently Asked Questions, Oct. 12, 2003, Trustic Inc, http://web.archive.org/web/20030731104405/bloglines.com/help/faq.*

My Yahoo!, RSS Headlines Module—Frequently Asked Questions, Jan. 24, 2004, http://web.archive.org/web/20040124175747/http://my.yahoo.com/s/rss-faq.html.*

Mark Pilgrim, autorss.py, Dec. 17, 2002.*

Alan Levine, Pssss . . . Have You Heard About RSS?, Dec. 1, 2003, mcli Forum, vol. 6, pp. 8-11.*

James Lewin, An introduction to RSS news feeds, Nov. 10, 2000, http://www.ibm.com/developerworks/library/w-rss.html.*

Oracle Teams with Yahoo! To Bring Personalized News to Enterprise Portals, Jul. 15, 2003, http://docs.yahoo.com/docs/pr/release1104.html.*

* cited by examiner

YAHOO! search | search engine watch

Yahoo! Search — Advanced Preference

Web | Images | Directory | Yellow Pages | News | Products

SPONSOR RESULTS (What's this?) (Become a Sponsor)    Sponsor Results

Search Engine Ranking Secrets Revealed
Increase your Web site search engine rankings quickly and easily. Just...
www.domain8.com

- Search Traffic Equals More Business — Morepro marketing drives search engine traffic to your site through SEO, e-mail marketing and Web site promotions. Drive traffic to your site and watch your business grow.
  www.domain1.com
- Watch Our Free Video On Search Engines — Get more traffic to your Web site! Watch our free video on how to get more business to your Web site! Use our traffic generator packages! Starting at $29.95!
  www.domain2.com See your message here...

TOP 20 WEB RESULTS out of about 3,730,000 (What's this?)

1. Search Engine Watch: Tips About Internet Search Engines & Search Engine Submission
   Search Engine Watch is the authoritative guide to searching at Internet search engines and search engine registration and ranking issues. Learn to submit URLs, use HTML meta tags and boost... ...Stats. Features. Search Engine Watch. 408 ources. Members Ar 410 /ith Exclusive Content...
   RSS: View as XML - Add to My Yahoo! [Beta]
   www.domain3.com - 43k - Cached - More pages from this site

406

2. Search Links: Search Engines Worldwide
   ... Stats. Features. Search Engine Watch. Resources. Members Area With Exclusive Content... Search Engine Watch publisher Jupitermedia offers research reports and briefing papers on various ...
   www.domain4.com - 38k - Cached - More pages from this site 3. Major Search Engines and Directories
   Summary of the major search engines summarized, with historical background and reasons why each is important to webmasters or users. ... listed in these search engines, see Search Engine Watch's Search Engine Submission Tips section for ... the essentials to submitting to search engines and improving your chances of...
   www.domain5.com 4. Netscape Integrates Directory
   ... Search Engine Watch publisher Jupitermedia offers research reports and briefing papers on various topics ... Search Engine Report Archives. Search Engine Watch. www.searchenginewatch.com ...
   www.domain6.com 5. Search Engine Submission Tips
   Covers search engine submission and registration issues - how to use meta tags, submit URLs, and boost placement in search engines. From Search Engine Watch, which also has tips on searching ... ... Stats. Features. Search Engine Watch. Resources. Members Area with Exclusive Content ...
   www.domain7.com

INTEGRATION OF PERSONALIZED PORTALS WITH WEB CONTENT SYNDICATION

CROSS-REFERENCE TO RELATED APPLICATION

This application claims priority to U.S. Provisional Patent Application No. 60/553,644, filed Mar. 15, 2004, titled "Integration of Personalized Portals with Web Content Syndication," the disclosure of which is incorporated by reference herein in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates in general to World Wide Web portals, and in particular to integration of personalized portals with Web content syndication.

Web content syndication is an increasingly popular way for content providers to draw attention (and visitors) to their World Wide Web (Web) pages or sites. Using generally available content syndication technologies such as RSS (Rich Site Summary, also sometimes called Really Simple Syndication and RDF [resource description framework] Site Summary), a content provider can easily create an XML summary of the site's content. The summary, which typically includes a number of "headlines" having various segments such as a title, a link to the content, and a brief description, is stored on the originating site's Web server as an RSS "feed." The RSS feed can be created and updated manually (e.g., by editing the XML) or automatically (e.g., by using various scripts to periodically scan the site and update the XML). Operators of other sites, or individual users, can "subscribe" a page to the RSS feed by including a reference to the desired RSS feed in the HTML or other source code for the subscribed page. When the subscribed page is displayed, the RSS feed (which is maintained on the originating site's server) is accessed, and the title of each item in the summary is displayed on the subscribed page as a link. A viewer of the subscribing page can click on any of these links to view the item at the originating site.

In theory, a user could aggregate RSS feeds from all of the websites he or she regularly visits onto a single "master" page that the user controls. By reviewing the master page, the user would be able to see whether any new content has been added to any of the sites.

In practice, this is not so easy, in part because it is not always apparent whether an RSS feed is available from a particular page or site. For example, a user who executes a search using a Web search service may receive a large number of links to "hit" pages or sites. Without clicking through the links to visit the various pages or sites, the user cannot determine whether the site has an RSS feed. In addition, if the user discovers that there is an RSS feed and decides to subscribe, the user would have to separately access his or her master page in order to add the RSS feed.

Thus, it would be desirable to provide less cumbersome ways for users to add RSS feeds to a master page or other user-owned page.

BRIEF SUMMARY OF THE INVENTION

Embodiments of the present invention provide integration of personal portal pages for individual users with web content syndication. According to one aspect of the invention, a method for responding to a user query is provided. The query is received from the user, and a list of hits is generated, with each hit referencing a target page or site. For each target page or site, it is determined whether the target page or site has an associated syndication feed. The list of hits is displayed for the user, and a syndication option is included for each target page or site with an associated syndication feed. A selection of the syndication option for one of the hits is received from the user. In response to this selection, a personal portal page for the user is updated to include a subscription to the syndication feed selected by the user. The syndication feed may be, for example, an RSS feed. In some embodiments, the user may also be able to select syndication feeds for subscription via an alternative interface.

According to another embodiment, a method is provided for responding to a query for syndication feeds and subscribing a personal portal page to a selected syndication feed. The method includes receiving the query from a user. In response to the query, a list of one or more hits is generated, wherein each hit references a syndication feed. The list of one or more hits is displayed along with a syndication option for each syndication feed referenced by the hits. A selection of the syndication option is received from the user for one or more of the hits. In response to the selection, the user's personal portal page is subscribed to each syndication feed selected by the user. According to a specific embodiment, the user might be a human user or a computer user.

According to another embodiment, a system for responding to a query for syndication feeds includes a syndication database configured to store a searchable index of syndication feeds. A client system is provided that is configured to generate a query. And a search server is provided that is configured to receive the query from the client system and search the index to generate a list of one or more hits, each hit referencing one of the syndication feeds. The client system is configured to: i) receive the list of hits from the search server for presentation, the presentation including a syndication option for the hits; ii) receive a selection of the syndication option for at least one of the hits; and iii) in response to the selection, subscribe the portal page to each syndication feed selected via the syndication options.

The following detailed description together with the accompanying drawings will provide a better understanding of the nature and advantages of the present invention.

BRIEF DESCRIPTION OF THE DRAWINGS

FIG. 4A is an example of a search-results page generated in response to a user query according to an embodiment of the present invention.

DETAILED DESCRIPTION OF THE INVENTION

I. Overview

A. Network Implementation

Figure 1:
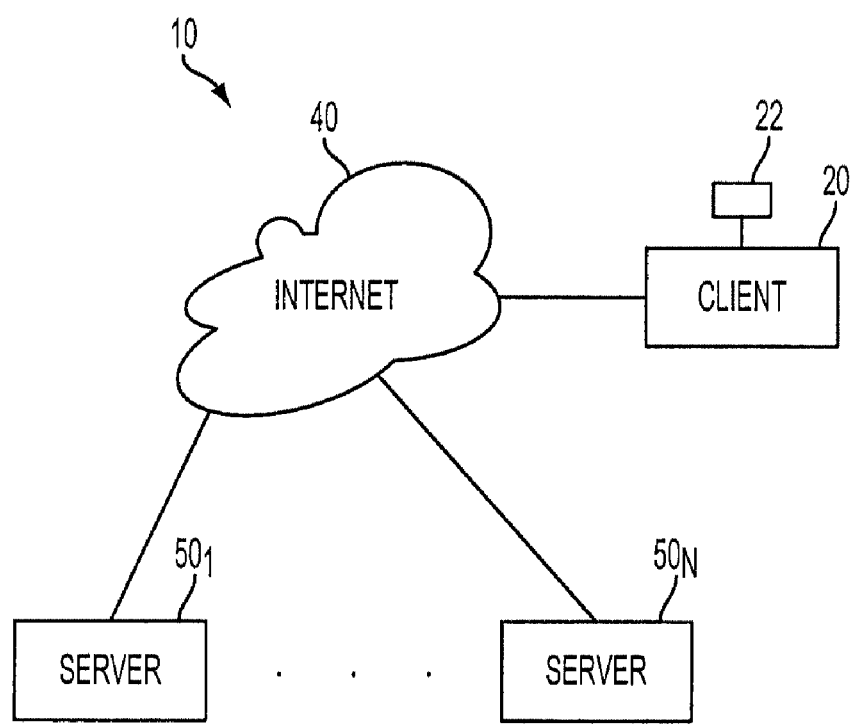
FIG. 1 is a block diagram of an information retrieval and communication network according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extra-net, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
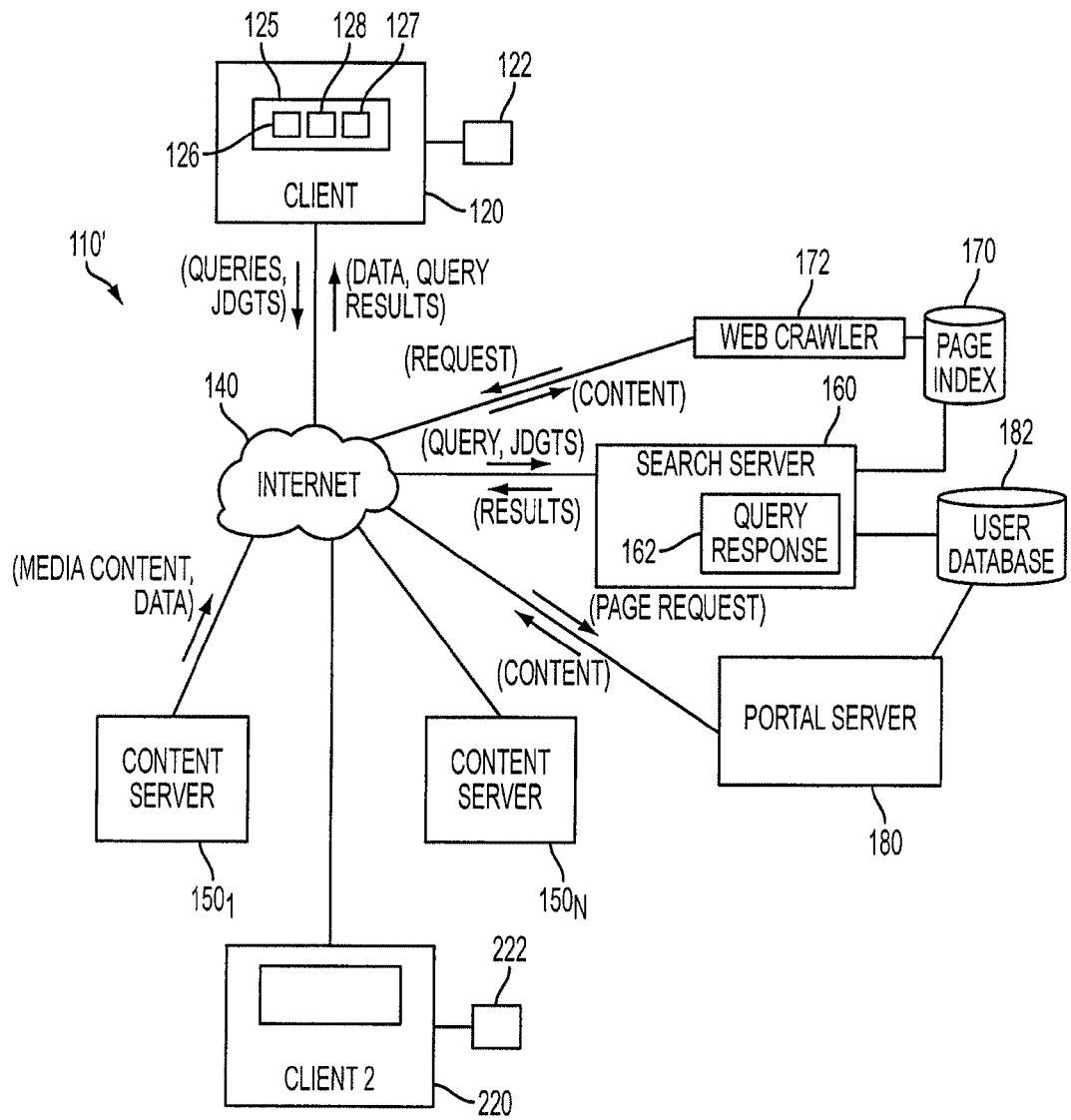
FIG. 2 is a block diagram of an information retrieval and communication network according to another embodiment of the present invention.

FIG. 2 illustrates another information retrieval and communication network 110 for communicating media content according to an embodiment of the invention. As shown, network 110 includes client system 120, one or more content server systems 150, and a search-server system 160. In network 110, client system 120 is communicably coupled through Internet 140, or other communication network, to server systems 150 and 160. As discussed above, client system 120 and its components are configured to communicate with server systems 150 and 160 and other server systems over the Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in various objects, frames, and windows.

Additionally, client application module 125 includes various software modules for processing data and media content, such as a specialized search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with according to aspects of the present invention include various e-mail applications, instant messaging (IM) applications, browser applications, document management applications and others. Further, interface module 127 may include a browser, such as a default browser configured on client system 120 or a different browser.

2. Search Server System

According to one embodiment, search-server system 160 is configured to provide search result data and media content to client system 120, and content server system 150 is configured to provide data and media content, such as web pages to client system 120, for example, in response to links selected in search result pages provided by search-server system 160. In some variations, search-server system 160 returns content as well as, or instead of, links and/or other references to content. Search-server system 160 includes a query response module 162 configured to receive a query from a user and generate search result data therefor.

Query response module 162 in one embodiment references various page indexes 170 that are populated with, e.g., pages, links to pages, data representing the content of indexed pages, etc. Page indexes may be generated by various collection technologies including an automatic web crawler 172, and/or various spiders, etc., as well as manual or semi-automatic classification algorithms and interfaces for classifying and ranking web pages within a hierarchical structure. These technologies may be implemented on search-server system 160 or in a separate system (not shown) that generates a page index 170 and makes it available to search-server system 160. Various page index implementations and formats are known in the art and may be used for page index 170.

Query response module 162 is configured to provide data responsive to various search requests (queries) received from a client system, in particular from search module 126. As used herein, the term "query" encompasses any request from a user (e.g., via client 120) to search-server system 160 that can be satisfied by searching the Web (or other corpus) indexed by page index 170. In one embodiment, a user is presented with a search interface via search module 126. The interface may include a text box into which a user may enter a query (e.g., by typing), check boxes, and/or radio buttons for selecting from predefined queries, a directory or other structure enabling the user to limit search to a predefined subset of the full search corpus (e.g., to certain web sites or a categorical subsection within page index 170), etc. Any search interface may be used.

Query response module 162 is advantageously configured with search related algorithms for processing and ranking web pages relative to a given query (e.g., based on a combination of logical relevance, as measured by patterns of occurrence of the search terms in the query; context identifiers associated with query terms and/or particular pages or sites; page sponsorship; connectivity data collected from multiple pages; etc.). For example, query response module 162 may parse a received query to extract one or more keywords, then access page index 170 using the keywords, thereby generating a list of hits. Query response module 162 may then rank the hits using one or more ranking algorithms, which in some embodiments may include conventional ranking algorithms.

In one embodiment of the present invention, query response module 162 is also configured to return information to the user indicating which of the various search hits have an associated RSS feed. For example, web crawler 172 may search for RSS feeds available at a particular web site and store an identifier for any such RSS feed in association with the URL for the page or site in page index 170 or in a separate index of RSS feeds (not shown). This information is then made available to query response module 162 during query processing.

In accordance with an embodiment of the present invention, search-server system 160 is affiliated with a portal server 180. Portal server 180 collects various content from content servers $150_1$-$150_N$ and assembles it into a portal page that can be presented to the user via client 126. In some embodiments, the portal page may include a search box for transmitting a search query to search-server system 160.

It will be appreciated that the search system described herein is illustrative and that variations and modifications are possible. The content servers, search-server system, and portal server may be part of a single organization, e.g., a distributed server system as provided to users by Yahoo! Inc., or they may be part of disparate organizations. Each server system generally includes at least one server and an associated database system, and may include multiple servers and associated database systems, and although shown as a single block, may be geographically distributed. For example, all servers of a search-server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search-server system may be configured with one or more page indexes and algorithms for accessing the page index(es) and providing search results to users in response to search queries received from client systems. The search-server system might generate the page indexes itself, receive page indexes from another source (e.g., a separate server system), or receive page indexes from another source and perform further processing thereof (e.g., addition or updating of various page information).

II. Syndicated Content for Personalized Portals

In some embodiments, portal server 180 maintains a user database 182, which stores personal preferences and other information for each registered user of portal server 180 and/ or search-server system 160. Portal server 180 and/or search-server system 160 advantageously access this user information to provide a range of personalization or customization capabilities for particular users. In one embodiment, users may interact with portal server 180 and/or search-server system 160 (e.g., they may execute searches or view standardized content) without first registering with the service, signing in, or otherwise identifying themselves; however, user database 182 might only store information for registered users, and personalization or customization features might only be available to registered users who have signed in. Various options for enabling user identification and authentication (e.g., providing each registered user a unique user ID and a password and providing a login interface that prompts the user to enter this information) are known in the art and may be incorporated into portal server 180 and/or search-server system 160. In one embodiment, portal server 180 and search-server system 160 share user identification information, and the user ID and password may be common to both servers. For example, in some embodiments, various pages provided by portal server 180 include search boxes where the user can enter a query for processing by search-server system 160. If a user who is logged into portal server 180 enters a search query, the user ID may be forwarded to search-server system 160 in association with the query so that search-server system 160 can apply the user's search personalization features without requiring the user to log in again. Various search personalization features may be applied by search-server system 160, and a detailed description is omitted as not being critical to understanding the present invention.

Among the personalization features that portal server 180 may provide to a user who signs in, is a personalized (or customized) portal page for that user. This page may incorporate various types of content selected by that user, who may elect to use it as a home page or simply visit it from time to time.

Figure 3:
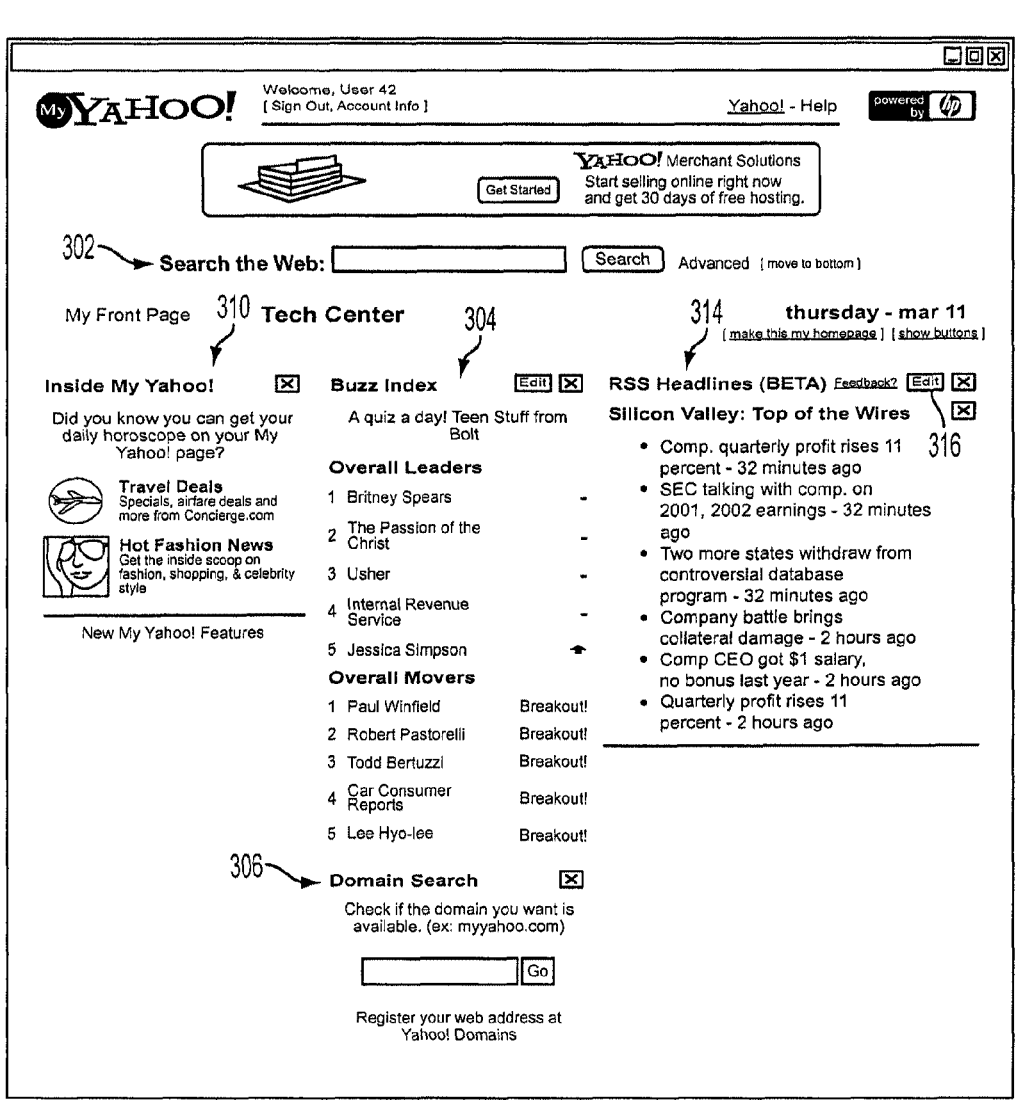
FIG. 3 is an example of a personalized portal page for a user according to an embodiment of the present invention.

FIG. 3 is an example of a customized portal page 300 for a registered user of the "My Yahoo!" service of Yahoo! Inc. Page 300 includes a search box 302 for initiating a document corpus search and various content sections 304, 306, 310, 314. Buttons (not shown) are provided to allow the user to customize the page content by selecting from a range of content types that portal server 180 may offer. Content types may include, e.g., news, weather reports, horoscopes, stock market information, data related to search activity on search-server system 160 (e.g., "Buzz Index" 304), and so on. Some of the content sections can also be edited; for example, the user may be able to select among various news sources, identify cities of interest for weather reports to be displayed, etc. In addition, the user may be able to customize the look and feel of the page, e.g., by arranging the selected content sections in a desired order, changing color schemes, and the like. Techniques for providing customizable web pages to registered users of a portal service are known in the art, and a detailed description is omitted as not being critical to understanding the present invention.

Of particular relevance to the present invention is "RSS Headlines" content section 314. This section displays information obtained from the RSS feeds of sites selected by the user. Although section 314 in FIG. 3 includes only one such feed, the user may be able to subscribe to feeds or unsubscribe from feeds via "Edit" button 316. In one embodiment, the user may subscribe to feeds from any source on the Web provided only that the RSS feed conforms to a protocol (e.g., RSS and/or other protocols) that the portal provider supports. Some embodiments may limit the number of feeds to which a user can be subscribed at any given time (e.g., to 10, 25, 50, or another number).

Various interfaces may be provided for the user to select feeds for subscription. For example, a box may be provided for the user to enter the name of an RSS feed; this can be used if the user already knows the name of the RSS feed. The user may also be able to type in the name of a Web site; in response, portal server 180 accesses that Web site and detects any RSS feeds. If the search server system finds an RSS feed, the user may be prompted to add the RSS feed to his portal page. If the search server system finds more than one RSS feed, a list of RSS feeds may be presented to the user, and the user can select the RSS feed(s) he wants to receive. The user may also be able to perform a keyword search for RSS feeds anywhere on the Web (or within a subset thereof) related to one or more keywords entered by the user. In one embodiment, this keyword search involves searching the content of the RSS feeds and/or metadata for the RSS feeds from various sites rather than searching entire sites.

In some embodiments of the present invention, finding of RSS feeds is also integrated with searches for content. For example, suppose that a user enters a query (e.g., "search engine watch") into search box 302. Results for this search, as shown in FIG. 4A, are presented on a results page 400 that might be generated by search-server system 160 in response to the query. For each search hit, the displayed result includes a title, an abstract, and a URL, all of which may be generated using conventional query response techniques. As in a conventional search result, each hit includes a link enabling the user to click through to the referenced page or site. In addition, search-server system 160 determines whether the site or page has an associated RSS feed and displays an "RSS" indicator 406 for any hit site or page that has an RSS feed. Where sponsored results are included (e.g., where content providers pay to have their sites prominently displayed in response to selected queries), an RSS indicator may also be provided for any sponsored result that has an associated RSS feed.

Figure 4B:
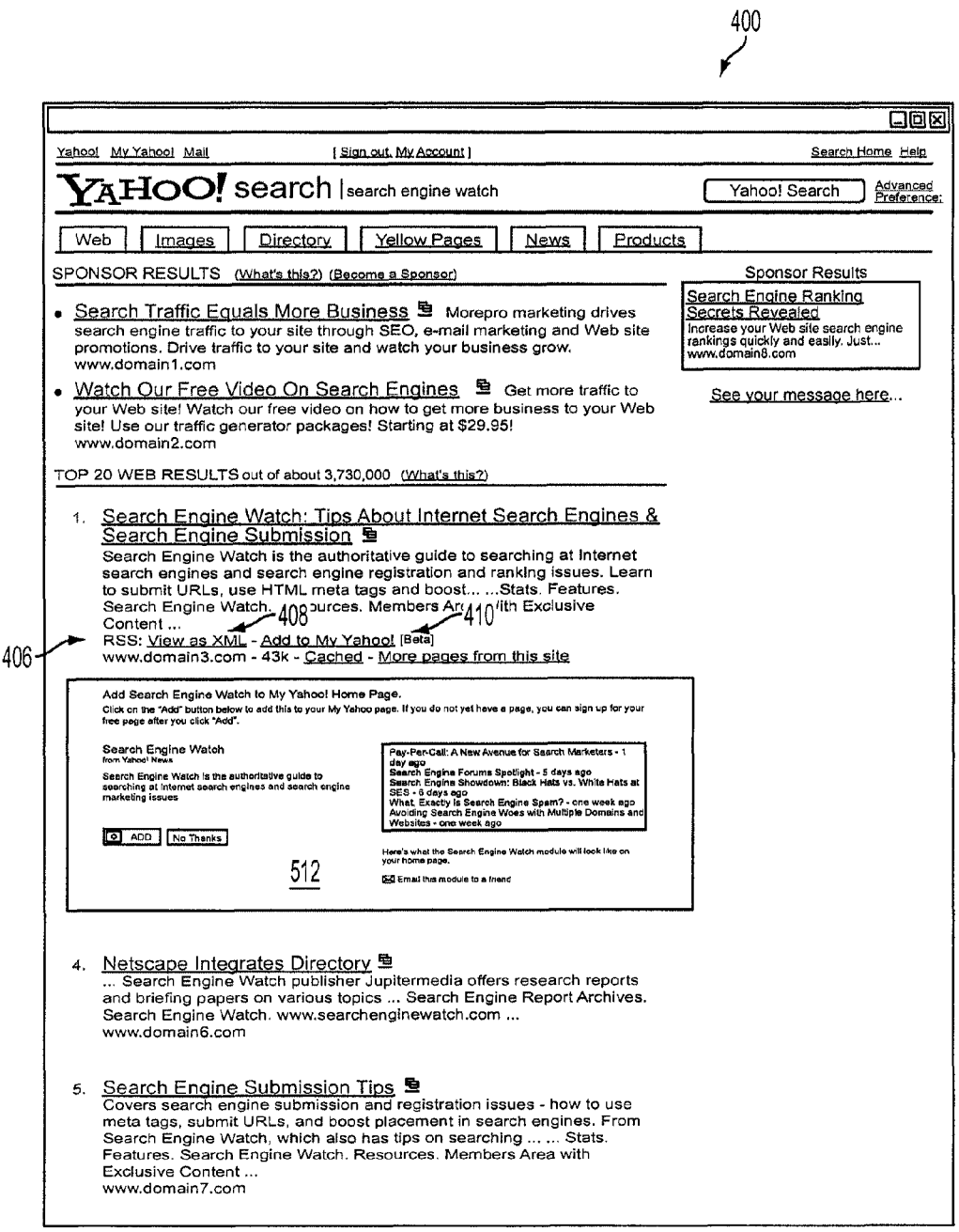
FIG. 4B is an example of a search-results page that includes a confirmation field having an RSS feed preview.
Figure 5A:
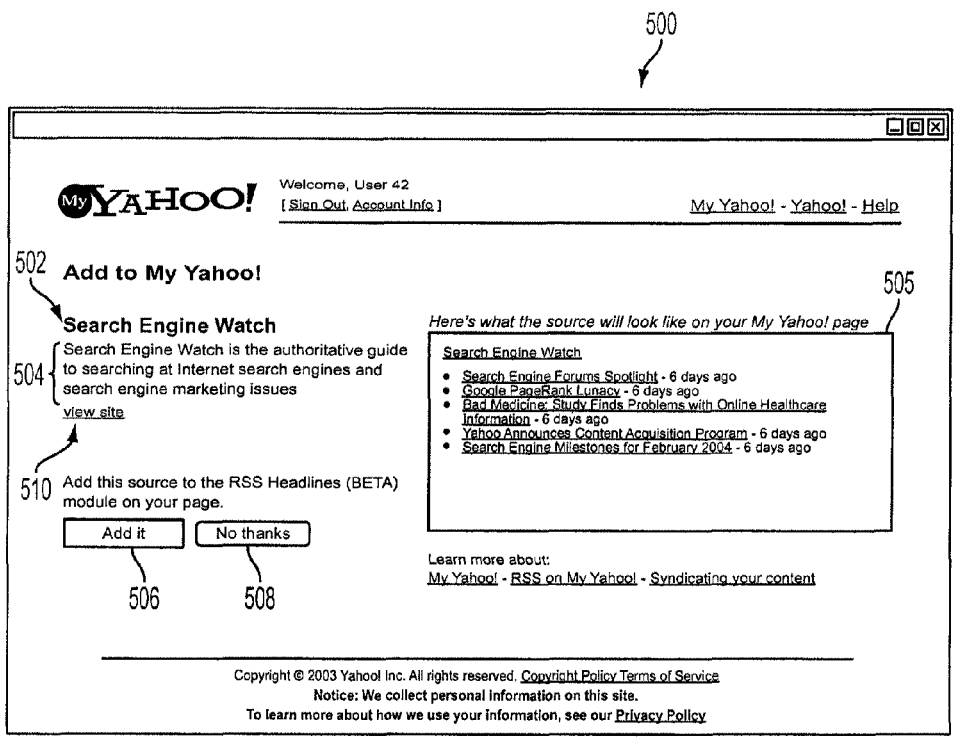
FIG. 5A is an example of a confirmation page that may be displayed when a user elects to add an RSS feed identified in a search to a personal portal page according to an embodiment of the present invention

In one embodiment, RSS indicator 406 includes buttons allowing the user to interact with the RSS feed. For instance, button 408 allows the user to view the XML source of the RSS feed. Button 410 allows the user to request the addition of the RSS feed to his or her personal portal page. In one embodiment, clicking on button 410 triggers the publication of a confirmation page 500 on client display 122 as shown in FIG. 5A. Confirmation page 500 displays the RSS feed title 502 and description 504, which may be obtained, e.g., from appropriate elements in the XML source code of the RSS feed. Content box 505 displays the current content of the RSS feed as it would appear on a subscribing page. A link 510 to the site itself can be used to visit the originating site of the RSS feed. Also provided are an "Add" button 506 and a "No thanks" button 508; these buttons allow the user to choose whether to add the RSS feed to his personal portal page. Clicking button 508 simply returns the user to search results page 400. In another embodiment, rather than launching a separate page, button 408 is configured to launch a confirmation field window 512 on results page 400 as shown in FIG. 4B. Field window 512 includes the same RSS preview information and control buttons as included on confirmation page 500 of FIG. 5A.

Figure 6:
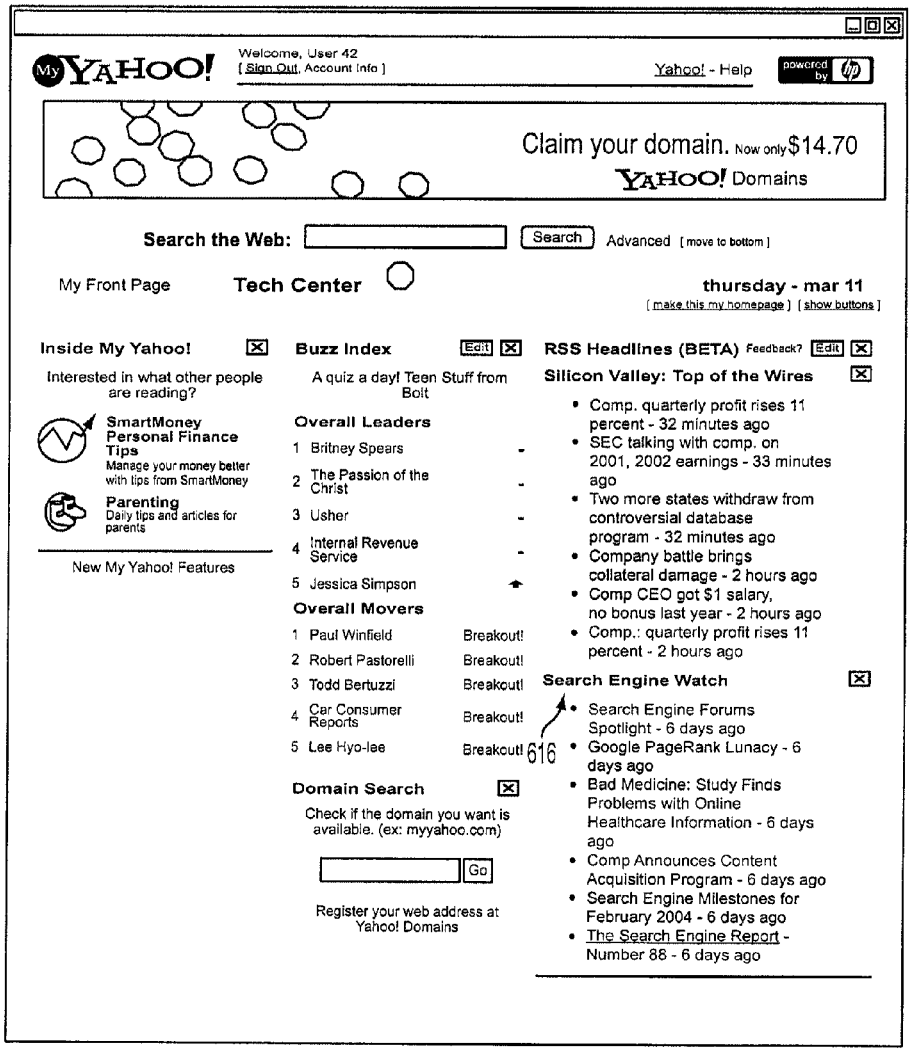
FIG. 6 is an example of a personalized portal page for a user modified to include a new RSS feed according to an embodiment of the present invention.

In response to the user clicking on "Add" button 506, client 120 sends a message to portal server 180. In some embodiments, this message may be sent via search-server system 160. The message may include the name of the RSS feed and/or the associated site, a user identifier for the user (if known), and possibly other information such as the search query the user had entered. If the user's identifier is not known when "Add" button 506 is clicked, a login page may be displayed so that the user can log in. After determining the user ID, portal server 180 updates the customization information for the user's portal page in user database 182 to include a subscription to the selected feed. The user's portal page is then displayed with the new feed included; as an example, page 600 of FIG. 6 is generally similar to page 300 of FIG. 3 but includes content 616 from the RSS feed shown in FIG. 5A.

In some embodiments, before adding an RSS feed, portal server 180 also determines whether the user's portal page is already subscribed to that feed in order to avoid having duplicate feeds. If the user is already subscribed to a requested RSS feed, the user is advantageously notified and prompted to confirm whether her or she wants to add the RSS feed, remove the RSS feed, or do nothing. Portal server 180 may also determine whether the user has already reached the limit on the number of feeds he or she can subscribe to (if a limit is applicable) and may notify the user if the selected feed cannot be added.

Figure 5B:
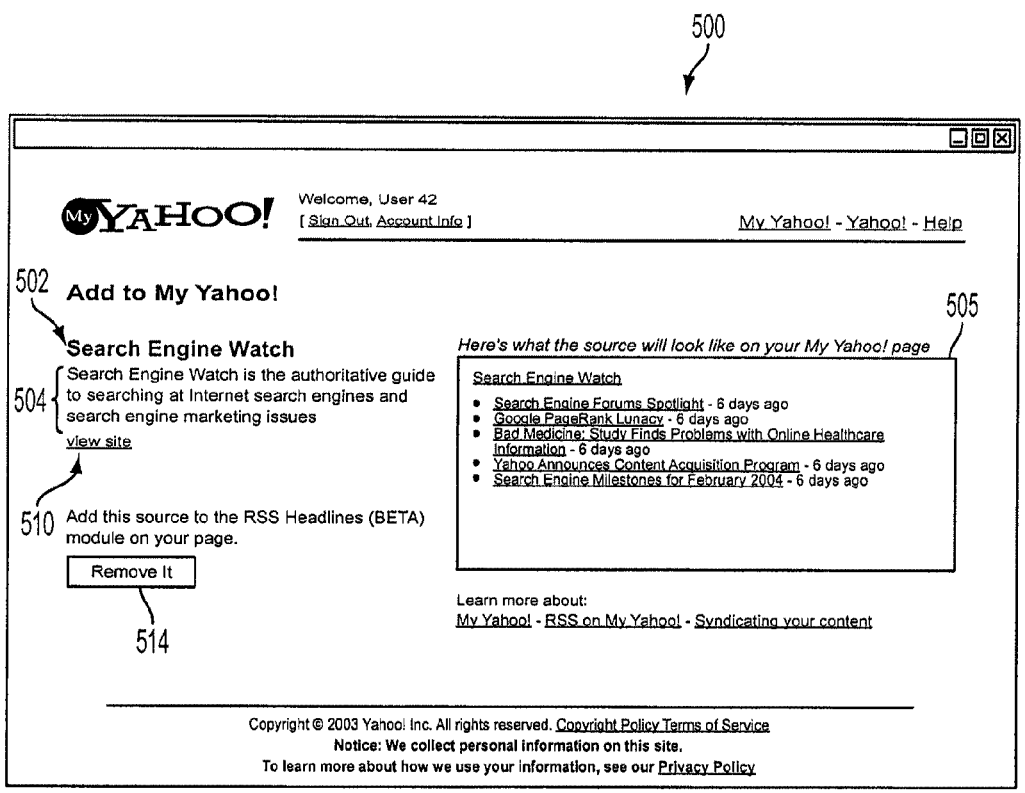
FIG. 5B is an example of the confirmation page having a Remove button for unsubscribing the personal portal page from an RSS feed.
Figure 7:
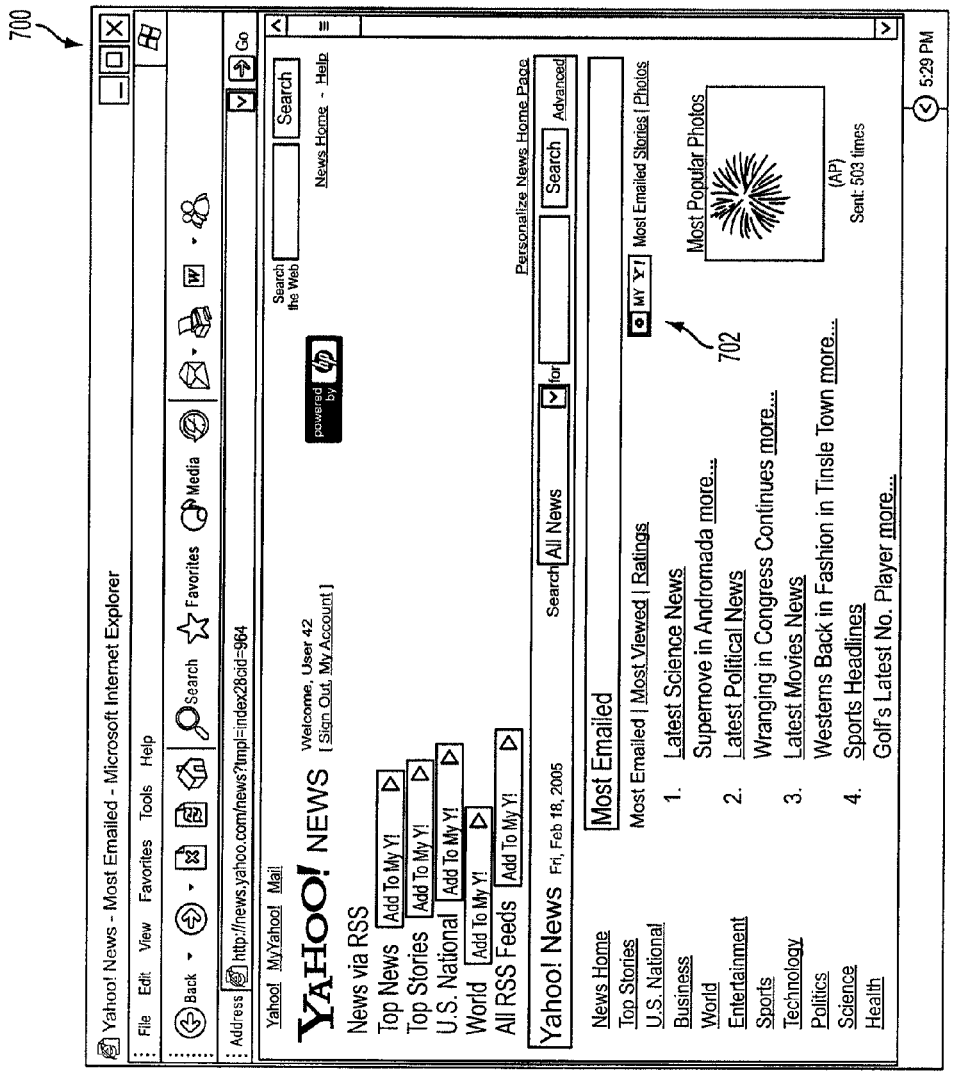
FIG. 7 is an example of a news page that includes a plurality of Add buttons for subscribing the personal portal page to news RSS feeds.

It will be appreciated that numerous variations on this procedure may be implemented. For example, some sites might provide multiple RSS feeds (e.g., the website of a news organization might have separate feeds for news, business, and sports headlines). In that case, page 500 of FIG. 5A might be modified to display each feed separately, with options to subscribe or not subscribe to each feed. In other embodiments, a confirmation page might not be used. Instead of displaying the updated portal page (e.g., as shown in FIG. 6) after a user adds an RSS feed, page 500 might be redisplayed with a confirmation message such as "You have successfully added this feed," and the user may be prompted to return to search results page 300. If a selected RSS feed has already been selected for display on the user's portal page, then confirmation page 500 might include a "Remove" button 514 as shown in FIG. 5B for removing the selected RSS feed from the user's portal page. Removing the selected RSS feed might include unsubscribing the page from the RSS feed. In still other embodiment, Add buttons and/or Remove buttons might be included on Web pages other than search pages. For example, any Web page (e.g., a third party Web page) that is configured to provide an RSS feed might include an Add button or a Remove button for respectively adding or removing the RSS feed. These Web pages might include personal Web pages, business and organization Web pages, pages hosted by Yahoo! and the like. For example, Yahoo! news home page 700 shown in FIG. 7 might include a plurality of Add buttons 702 and/or Remove buttons (not shown) for respectively subscribing a portal page to or unsubscribing a portal page from the RSS feeds listed on this page. The Add buttons and Remove buttons may provide a preview (e.g., FIG. 4B and 5B) of the RSS feed to be added or removed from the user's portal page.

In addition, any actions described as being performed by a search-server system may be performed by a portal server and vice versa. The format of the various pages shown herein may be varied, and the pages may be displayed in an existing browser window or by opening a new browser window or pop-up window as desired. User interfaces are not limited to buttons, text boxes, or other devices shown herein; any type of user interface elements may be used as long as client 120 can detect the user's request and send appropriate signals to search-server system 160 and/or portal server 180.

Figure 8:
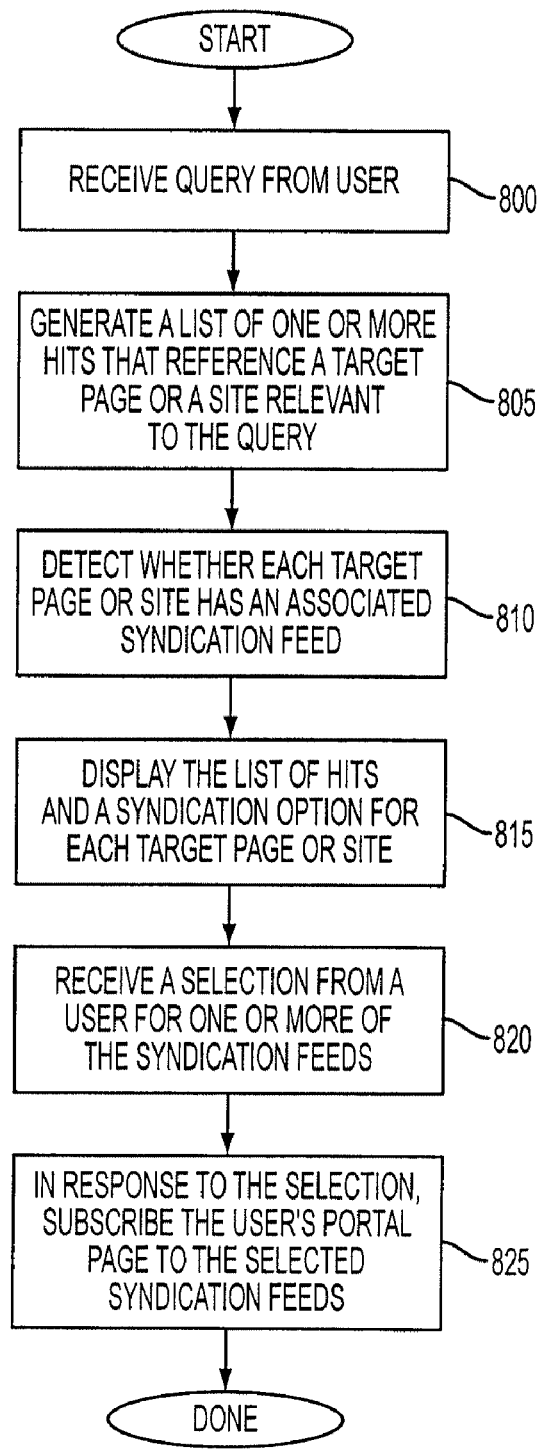
FIG. 8 is a high-level flow chart of a process steps for subscribing a personal portal page to a syndicated feed.

FIG. 8 is a high-level flow chart of a process for subscribing a personal portal page to a syndicated feed such that the syndicated feed is displayed on the personal portal page if this page is displayed. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At step 800, a query is received from a user, for example, via a browser client running on the user's client system. At step 805, in response to the query, a list of hits is generated, wherein each hit references a target page or a site (e.g., a Web site). Each target page or site referenced by a hit in this list is relevant to the query. At step 810, for each of the target page or the site, the target page or the site are reviewed to detect whether the target page or the site has an associated syndication feed. The syndication feed might be an RSS feed or other feed. At step 815, the list of hits is displayed, including a syndication option for each target page or site with an associated syndication feed. The list of hits might be displayed on the user's client system for use by the user. At step 820, a selection is received for the syndication option for one of the hits. The section might be received from the user via the user's client system. At step 825, in response to the selection, the personal portal page for the user is updated to include a subscription to the syndication feed selected by the user. Subscribing the personal portal page to the syndication feed provides that when the personal portal page is selected for display, the syndication feed is displayed on the personal portal page; see, for example, RSS feed 116 in FIG. 6.

III. RSS Feed Search-Server System

Figure 9:
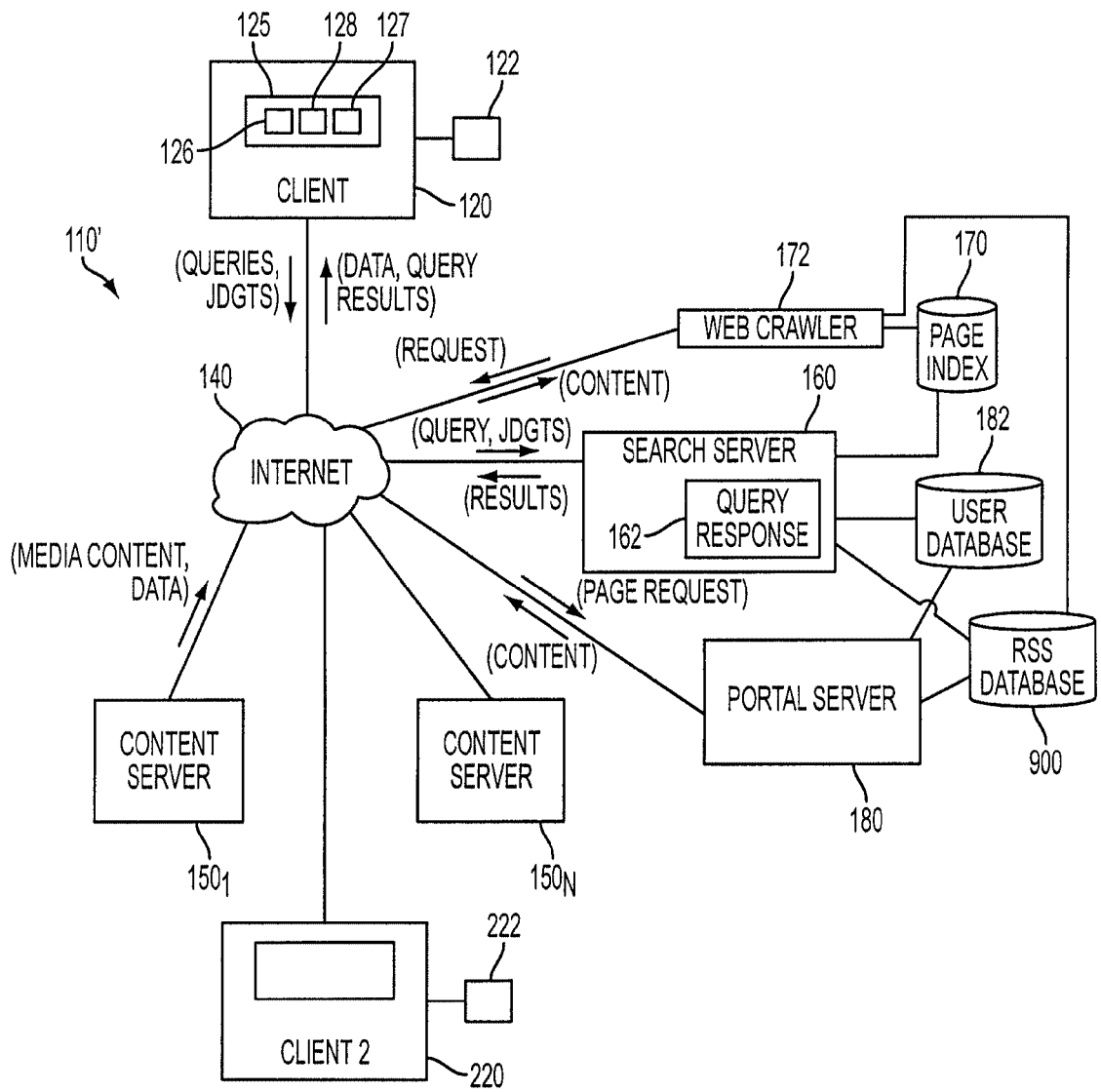
FIG. 9 is a block diagram of another information retrieval and communication network for communicating media content according to another embodiment of the invention.

FIG. 9 illustrates another information retrieval and communication network 110' for communicating media content according to another embodiment of the invention. As shown, communication network 110' includes an RSS database 900 that includes an index of RSS feeds or the like. The index is searchable, for example, by search-server system 160. The index might include metadata and/or content information for each syndication feed referenced in the RSS database 900. The index might be searched by search-server system 160 on receipt of a query issued by a user via a client system 120. On receipt of the query, search server system 160 searches the RSS database to identify syndication feeds relevant to the query. A syndication feed may be relevant to a query if one or more item of its indexed metadata and/or content information substantially match one or more query strings included in the query.

Figure 10:
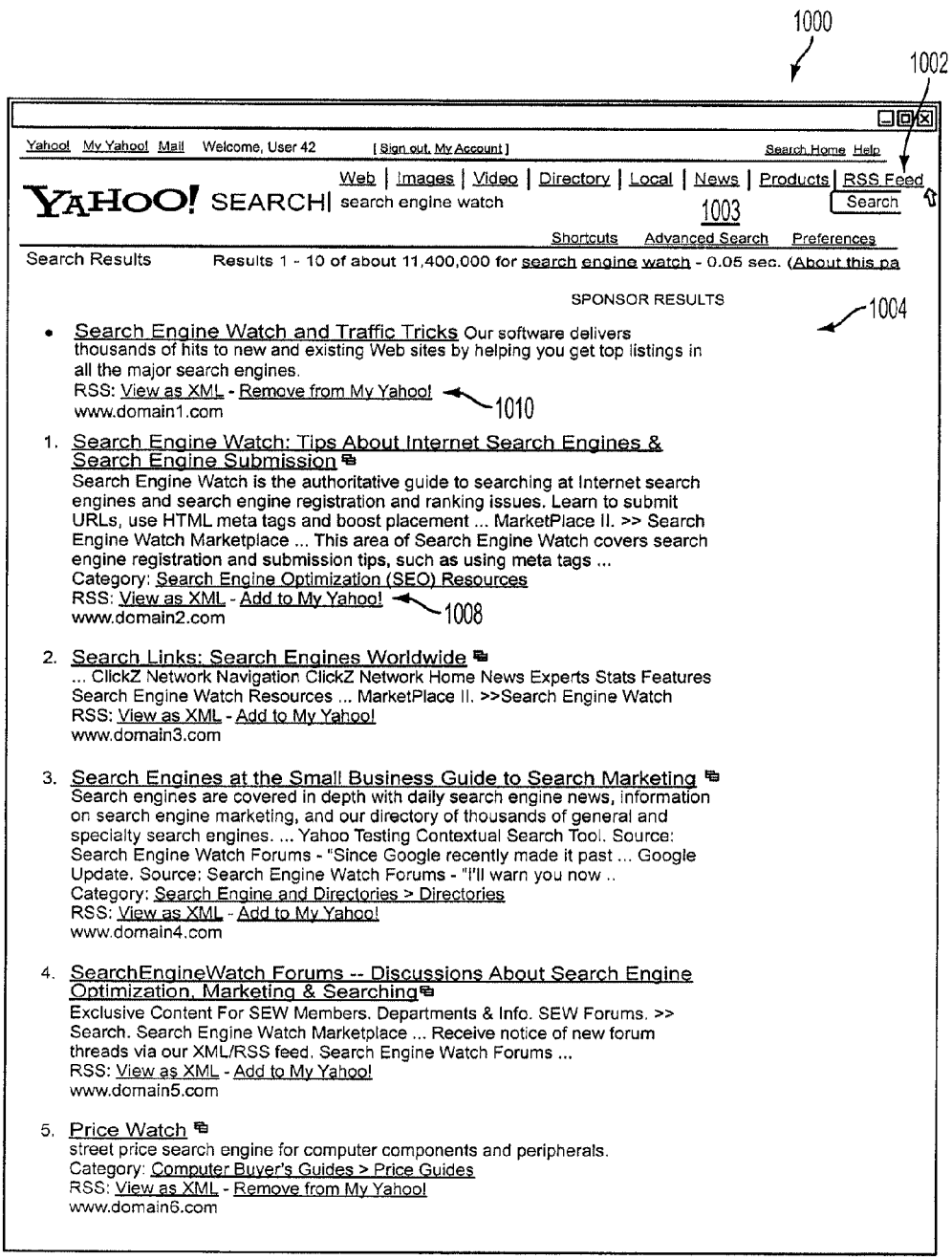
FIG. 10 is an example of a search page that includes an "RSS Feed" button that allows the user to direct the search-server system to search an RSS feed database for RSS feeds that are relevant to a query.

The user may request search-server system 160 to search for RSS feeds in the RSS database 900 by selecting an RSS feed search request on a search page, such as the Yahoo! search page. FIG. 10 illustrates an example search page 1000 that includes an "RSS feed" button 1002. By selecting RSS feed button 1002, the user directs search-server system 160 (or a dedicated RSS search server, not shown in FIG. 9) to search RSS database 900 for RSS feeds that are relevant to a query entered, for example, in search box 1003. FIG. 10 further shows a set of search results 1004 that might be generated by search-server system 160 in response to a query for RSS feeds. For each search hit, the displayed result might include a title, an abstract, and a URL, all of which may be generated using conventional query response techniques. The URL might be associated with a link that points to the page associated with the RSS feed. Each search hit might further include an "Add" button 1008 or a "Remove" button 1010. The Add button might be placed on the search page for an RSS feed to which the user portal page is not currently subscribed, and the Remove button might be placed on the search page for an RSS feed to which the user's portal page is currently subscribed. These buttons are configured to operate as described above for adding RSS feeds to and removing RSS feeds from the user's portal page.

According to one embodiment, the index of RSS feeds included in RSS database 900 might be populated by web crawler 172, or other indexer (e.g., a dedicated RSS feed indexer), that is configured to identify and collect information about web pages that provide RSS feeds.

Figure 11:
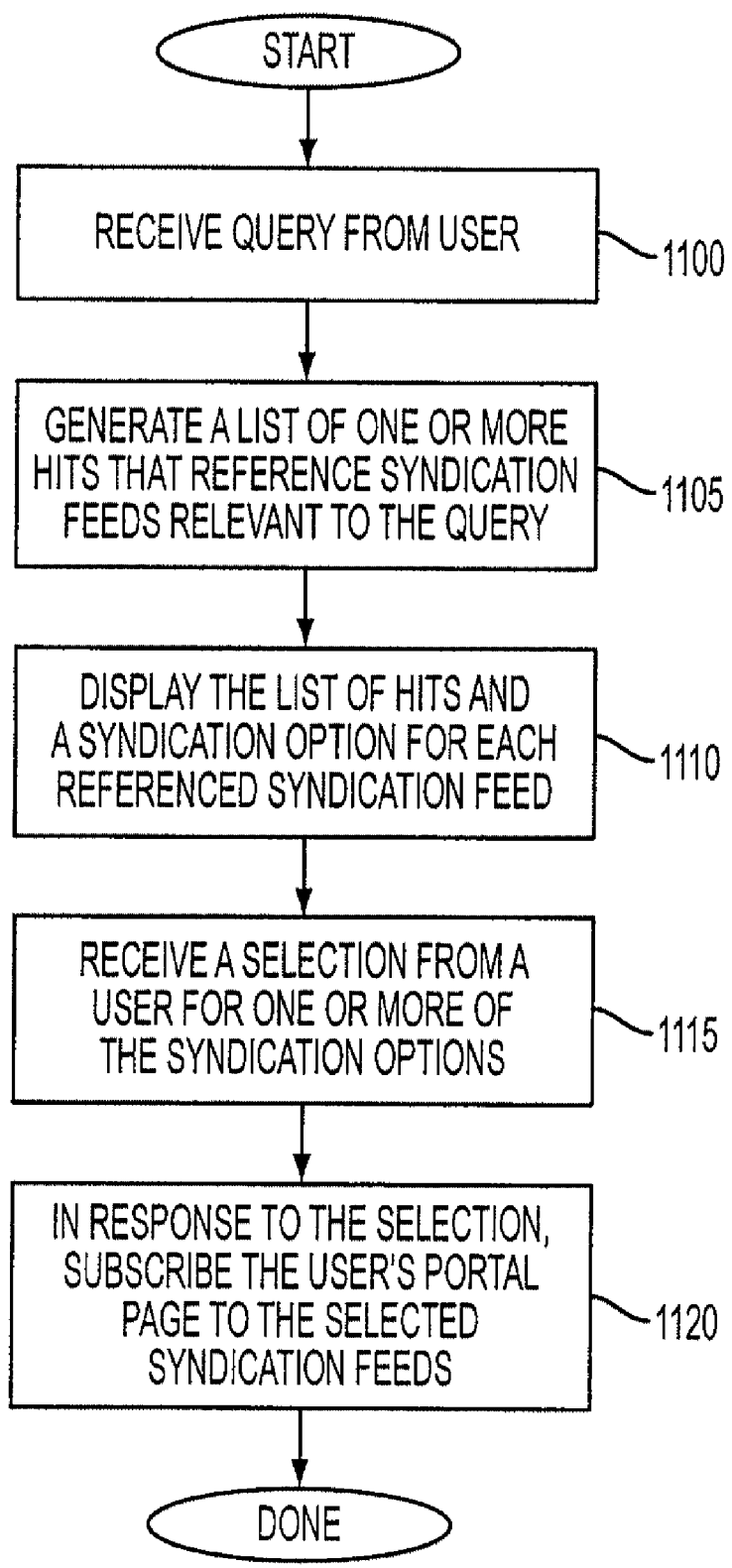
FIG. 11 is a high-level flow chart of a process for searching a syndication database for syndication feeds relevant to a query, and for subscribing a personal portal page to at least one syndicated feed identified in the search.

FIG. 11 is a high-level flow chart of a process for searching a syndication database for syndication feeds relevant to a query and subscribing a personal portal page to at least one syndicated feed identified in the search. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At step 1100, a query is received from a user, for example, via a browser application running on the user's client system. The user might be human or a computer. If the user is a computer, it might be the case that a human user is the ultimate recipient of a query response. At step 1105, in response to the query, a list of one or more hits is generated (e.g., by a search-server system). Each hit in this list references a syndication feed indexed in the syndication database, and each syndication feed referenced by the hits is relevant to the query. At step 1110, the list of one or more hits is displayed, for example, on the display of the user's associated client system. Each displayed hit includes a syndication option for its associated syndication feed. The syndication options might include user selectable screen buttons or other devices configured to permit a user to select a syndication feed to be added to his portal page. At step 1115, a selection for at least one of the syndication options is received from the user via the client system. At step 1120, in response to the user's selection, the user's personal portal page is subscribed to each selected syndication feed. If the user visits his personal portal page, the one or more syndication feeds selected by the user will be displayed on that page.

IV. Syndication Feed Preview Position

Figure 12A:
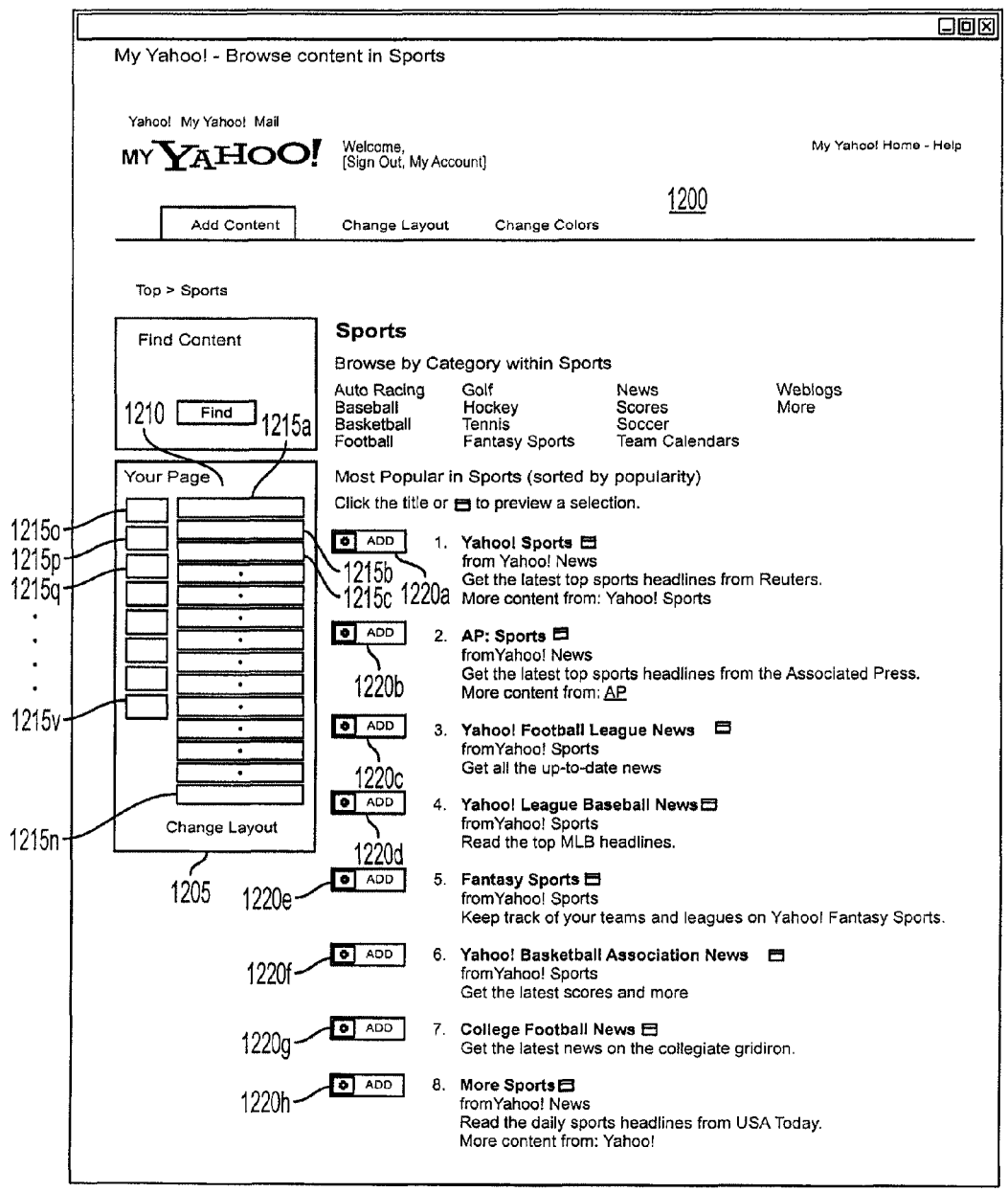
FIG. 12A is an illustration of a web page that includes a preview window showing the approximate positions of syndication feeds on a personal portal page

FIG. 12A is an illustration of a web page 1200 that includes a "preview" window 1205 that in turn includes an illustration of a personal portal page 1210. The illustration of the personal portal page 1210 might be an illustration of the user's personal portal page 300 or the like. The illustration of the personal portal page 1210 includes a set of "preview" modules 1215 that represent the content to which the user's personal portal page is subscribed. The preview modules 1215 are positioned in the illustration of the personal portal page in substantially the same locations that the content is positioned on the user's personal portal page. Each preview module 1215 might represent an RSS feed or other content (e.g., articles, selected ads, charts, etc.) on the page.

Figure 12B:
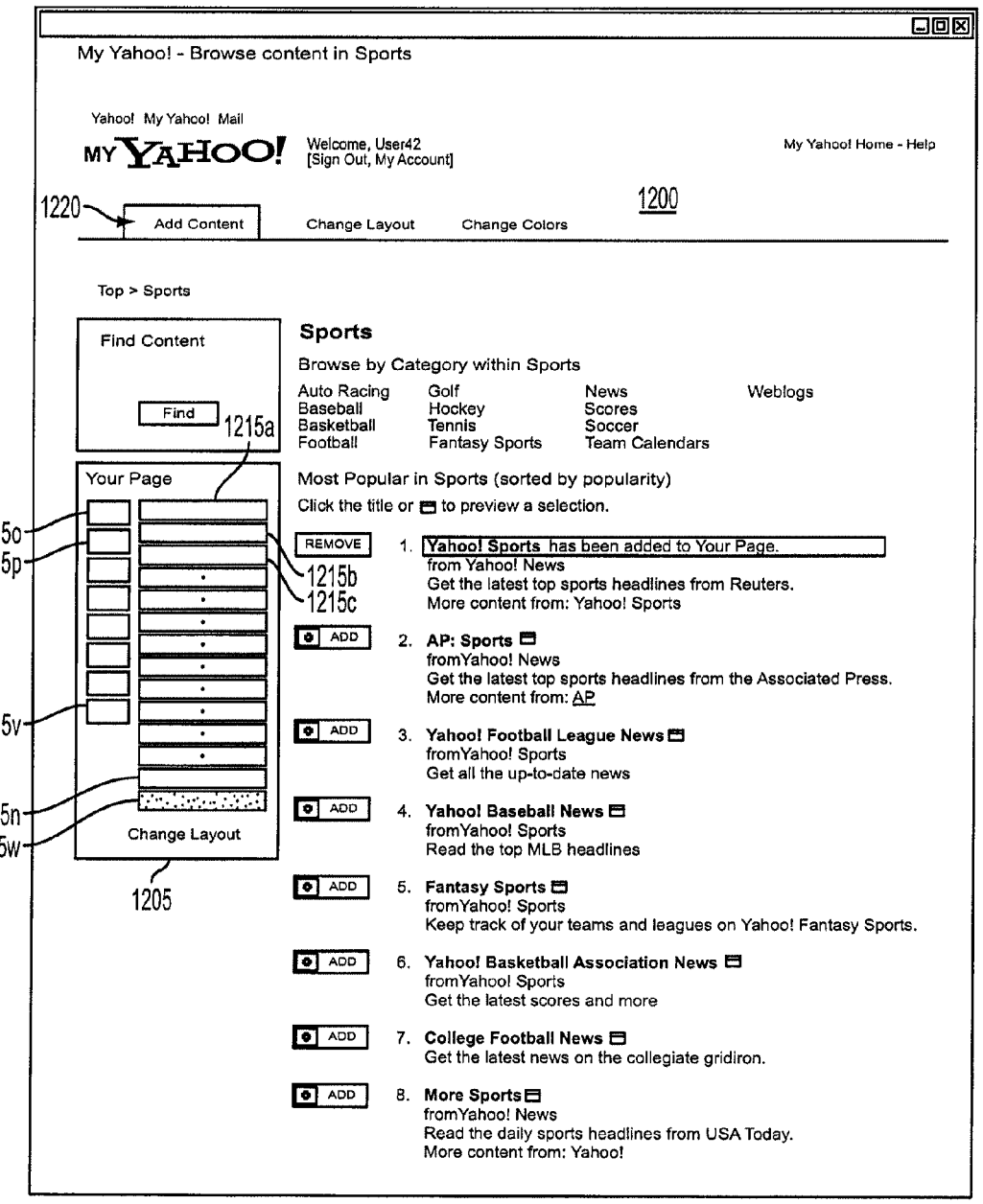
FIG. 12B shows the position of an added syndication feed in the preview view.

According to one embodiment, a set of "add" buttons 1220, for adding syndication feeds or other content to the user's personal portal page, are included on page 1200. If the user "presses" one of the add buttons 1220 (e.g., add button 1220a), a new preview module (e.g., preview module 1215w) for the selected RSS feed is added to preview window 1205 (see FIG. 12B). According to the example being considered, the selected RSS feed is a Yahoo! sports RSS feed, and the added preview module is positioned at the bottom of preview window 1205. According to one embodiment, the preview modules may be moved (e.g., dragged and dropped) within the preview window to effect changed placement of the corresponding content window on the user's personal portal page. The preview window and the preview modules are advantageously positioned on page 1200 to permit the user to relatively quickly identify the location of the added feed on his or her personal portal page (e.g., page 300).

Figure 12C:
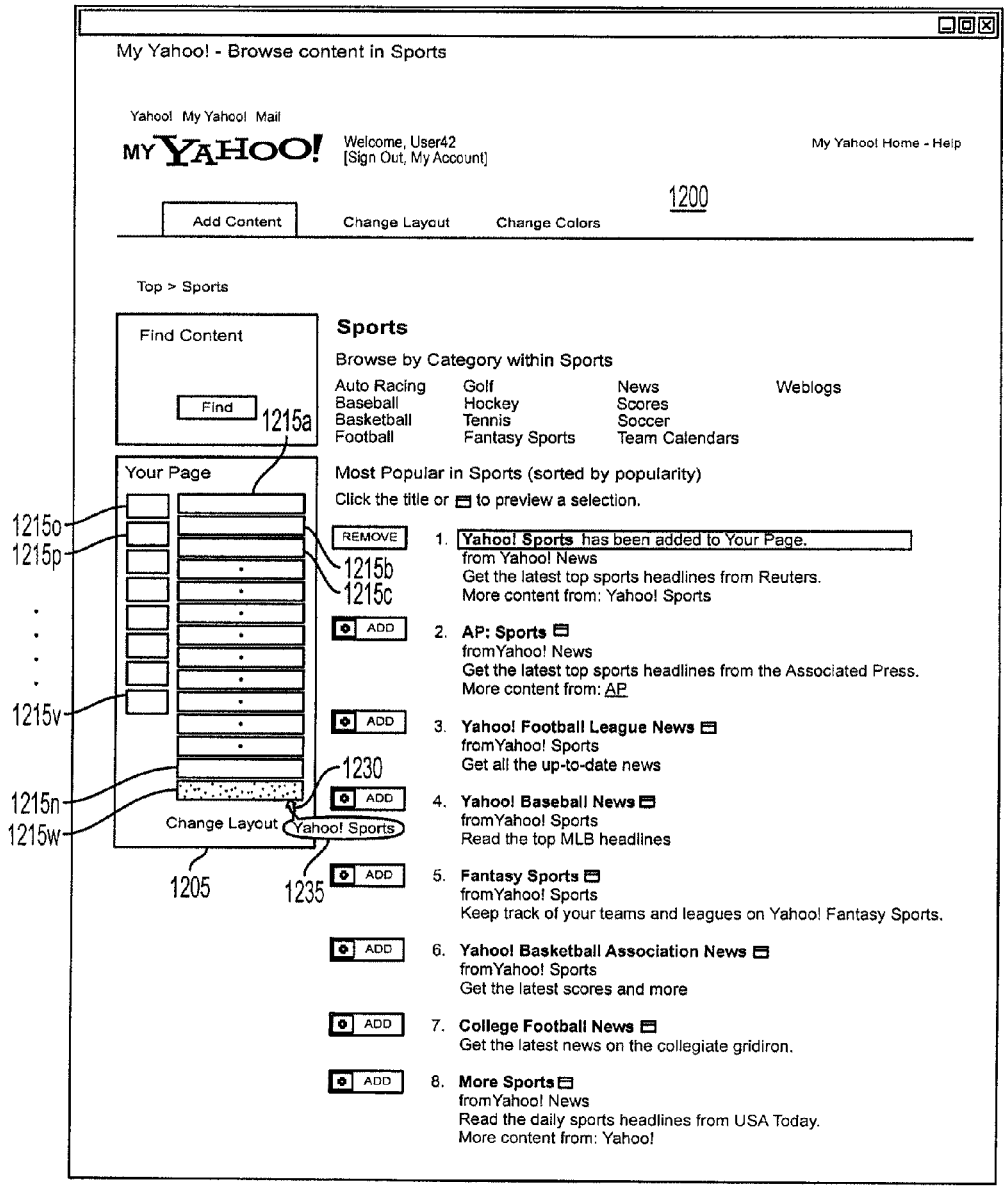
FIG. 12C shows an identification tag associated with a preview module such that the identification tag identifies the syndication feed associated with the preview module.

According to one embodiment of the invention, if a cursor 1230 is positioned over any of the preview windows, a "identification" tag 1235 is displayed that identifies the content associated with the preview module (see FIG. 12C). For example, identification tag 1235 indicates that preview module 1215w is associated with the Yahoo! sports RSS feed.

Figure 12D:
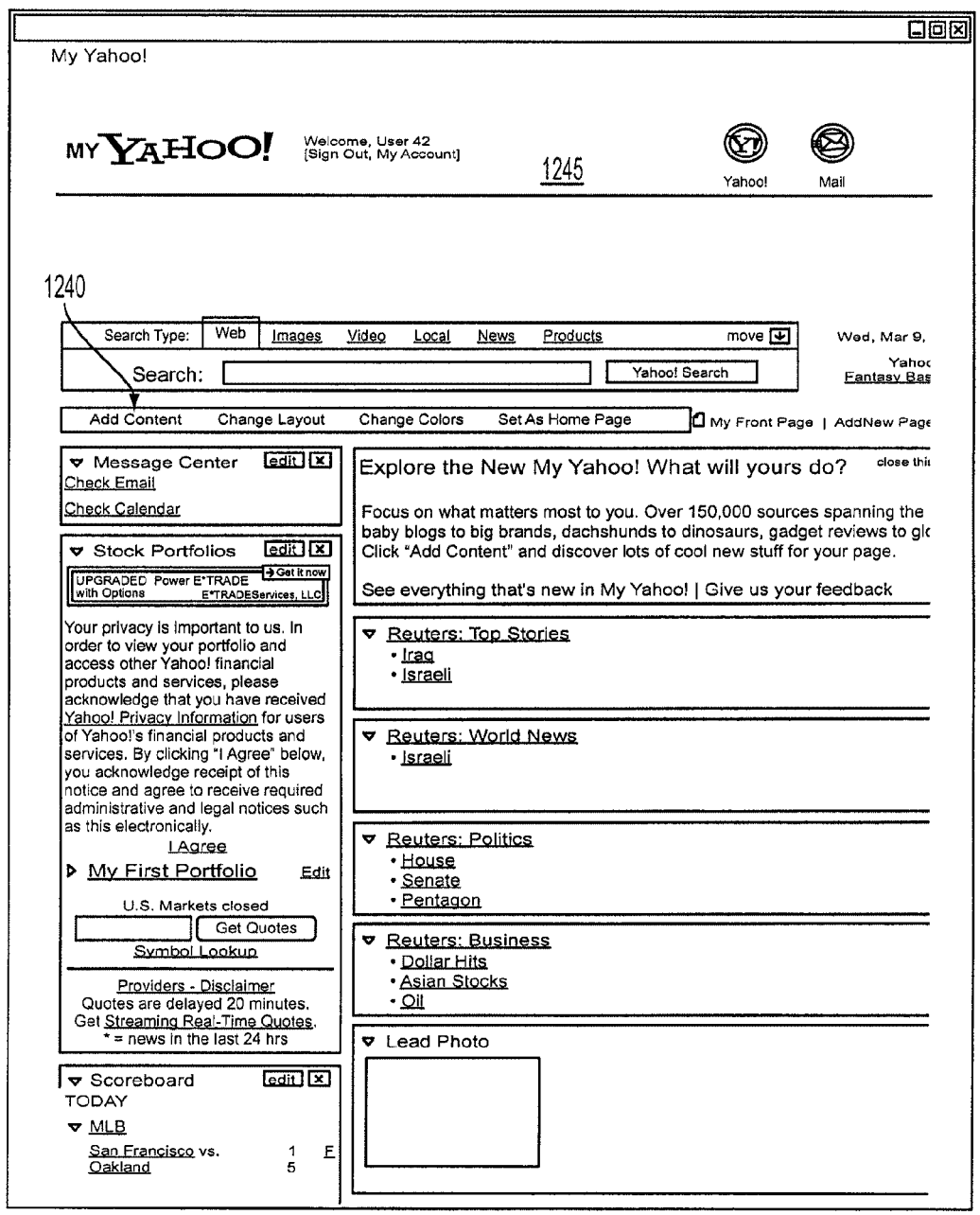
FIG. 12D is an illustration of a page that includes a user selectable option for adding content to a personal portal page.
Figure 12E:
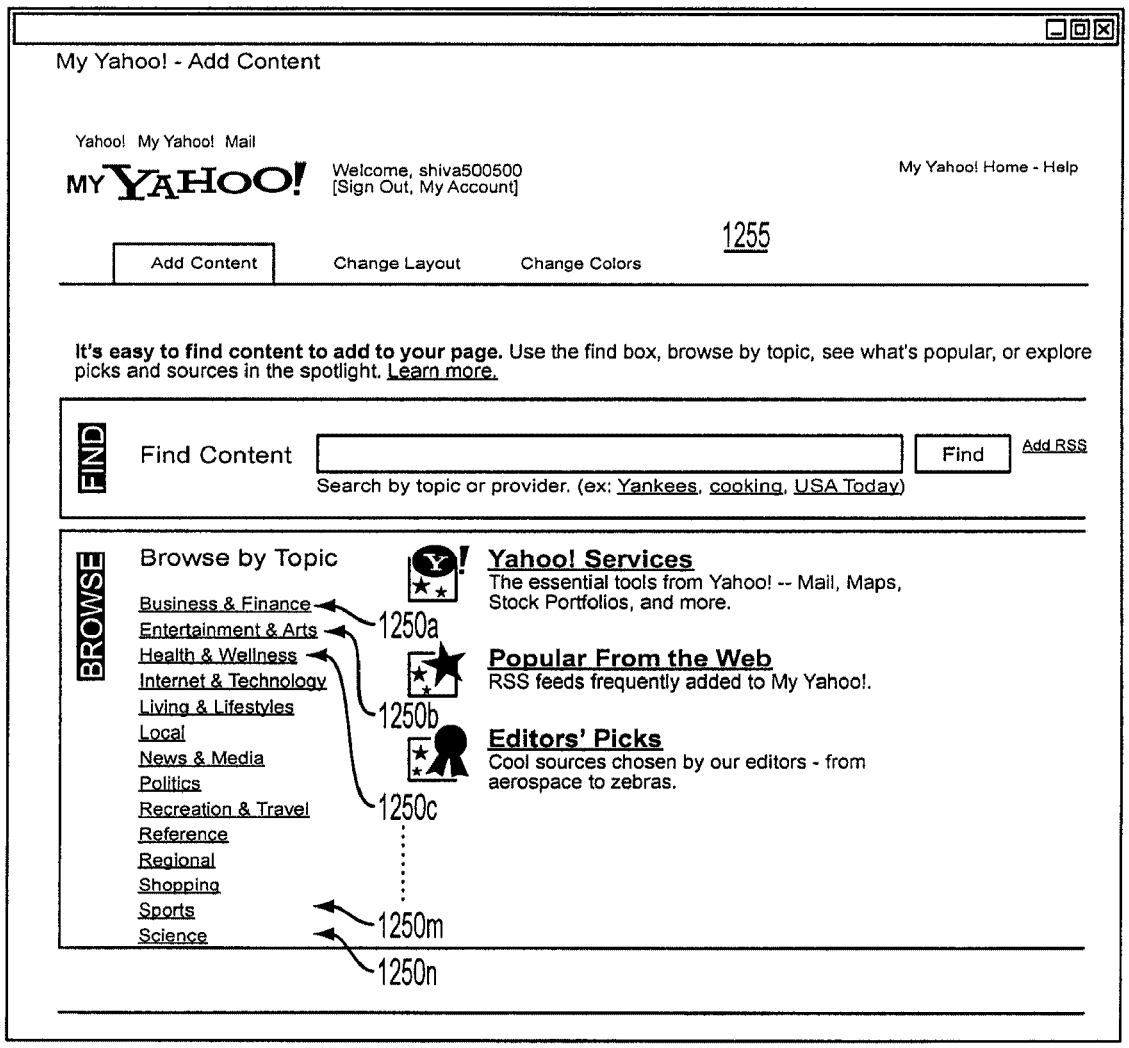
FIG. 12E is an illustration of page that includes user selectable options for adding content to a personal portal page.

Web page 1200 might be a dedicated page configured for subscribing the user's personal portal page to RSS feeds and/or other content. Web page 1200 might be launched via the selection an "add content" button 1240 or the like on personal portal page 1245 (see FIG. 12D), and via the subsequent selection of a "topic" button 1250 on an "add content" page 1255 (see FIG. 12E). Each topic button 1250 might be configured to launch a unique web page 1200 that provides a number of RSS feeds and/or other content that are selectable for addition to the personal portal page. According the example being considered, web page 1200 is launched via selection of topic button 1250m, which is associated with the Yahoo! sports RSS feed. While the foregoing describes a specific process for launching Web page 1200, it should be understood that this page may launched from a variety of pages and by a variety of processes. Moreover, FIG. 12A shows Web page 1200 according to a specific embodiment, this page may be variously organized and/or include other page features as will be readily understood by those of skill in the art.

While preview window 1205 and its preview modules 1215 are described above as being displayed on a dedicated Web page 1200, preview pane 1205 and the preview modules 1215 might be displayed on a variety of web pages that permit a user to add content to his or her personal portal page. For example, preview window 1205 and preview modules 1215 may be disposed on results page 400 (see FIG. 4A), confirmation page 500 (see FIG. 5A), search page 1000 (see FIG. 10) or other web page.

V. Further Embodiments

While the invention has been described with respect to specific embodiments, one skilled in the art will recognize that numerous modifications are possible. For instance, although the embodiments described herein may make reference to RSS, which is a particular syndication protocol, it is to be understood that other syndication formats (e.g., Atom, Channel Definition Format, Meta Content Framework, etc.), languages, and techniques may also be supported instead of or in addition to RSS. In addition, the embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) that includes some form of content syndication and that results may include content as well as links or references to locations where content may be found.

The appearance of search results, user interfaces, and portal pages may differ from the examples shown herein. For instance, interface elements are not limited to buttons, clickable links, text boxes or other specific components shown herein; any interface implementation may be used. Also, in some embodiments, a user may maintain multiple personal portal pages via a portal server, and these pages might be interlinked with each other. In such embodiments, if the user elects to add a syndication feed, the user may be prompted to select which of his portal pages is to be subscribed.

Computer programs incorporating various features of the present invention may be encoded on various computer readable media for storage; suitable media include magnetic disk or tape, optical storage media such as CD or DVD, and flash memory, for example. Computer readable media encoded with the program code may be packaged with a compatible device or provided separately from other devices.

While the present invention has been described with reference to specific hardware and software components, those skilled in the art will appreciate that different combinationsof hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for responding to a query, the method comprising:
    receiving in a general-purpose search engine, the query from a user including a plurality of search terms;
        generating, in response to the search terms, a list of one or more hits, each hit referencing a target page or site, the list of one or more hits capable of including each of one or more hits with an associated syndication feed and one or more hits without an associated syndication feed;
        for each target page or site, detecting whether the target page or the site has an associated syndication feed;
        providing the list of one or more hits capable of including each of one or more hits with an associated syndication feed and one or more hits without an associated syndication feed, including a syndication option for each target page or site that has an associated syndication feed;
        providing a preview pane of syndication feeds subscribed to by the user along with the list of one or more hits;
    receiving a selection of the syndication option for one of the hits from the user;
        updating the preview pane of syndication feeds to include the selection of the syndication option from the user;
        in response to the selection, updating a syndication content section on a personal portal page for the user to include a subscription to the syndication feed selected by the user, the personal portal page comprising content sections, other than the syndication content section, not associated with syndication feeds; and
        providing the personal portal page, as an alternative interface, for the user to subscribe the personal portal page to a syndication feed based on the updated personal portal page.

2. The method of claim 1, wherein the syndication feed comprises an RSS feed.

3. The method of claim 1, wherein the alternative interface includes a webpage or a syndication search page.

4. The method of claim 1, wherein the user is a human.

5. The method of claim 1, wherein the user is a computer.

6. The method of claim 1, further comprising in response to the selection, providing a preview page that includes a preview of the syndication feed.

7. The method of claim 1, further comprising in response to the selection, providing a field window that includes a preview of the syndication feed.

8. The method of claim 1, wherein the syndication option includes a user selectable screen button configured to initiate the subscription.

9. The method of claim 7, wherein a preview of the syndication feed comprises XML source code of the syndication feed.

10. A system for responding to a query, the system comprising:
    a client system configured to generate a query; and
    a search server including a general-purpose search engine configured to:
        receive the query from the client system including a plurality search terms and search a search index to generate, in response to the search terms, a list of one or more hits each hit referencing a target page or site, the list of one or more hits capable of including each of one or more hits with an associated syndication feed and one or more hits without an associated syndication feed;
        detect whether the target page or the site has an associated syndication feed;
        provide the list of one or more hits capable of including each of one or more hits with an associated syndication feed and one or more hits without an associated syndication feed, including a syndication option for each target page or site that has an associated syndication feed;
        provide a preview pane of syndication feeds subscribed to by a user along with the list of one or more hits;
        receive a selection of the syndication option for one of the hits from the user;
        update the preview pane of syndication feeds to include the selection of the syndication option from the user;
        in response to the selection, update a syndication content section on a personal portal page for the user to include a subscription to the syndication feed selected by the user, the personal portal page comprising content sections, other than the syndication content section, not associated with syndication feeds; and
        provide the personal portal page, as an alternative interface, for the user to subscribe the personal portal page to a syndication feed based on the updated personal portal page.

11. The system of claim 10, wherein the syndication feed comprises an RSS feed.

12. The system of claim 10, wherein the alternative interface includes a webpage or a syndication search page.

13. The system of claim 10, wherein the client system comprising a human operated system.

14. The system of claim 10, wherein the client system comprises a computer operated device.

15. The system of claim 10, further comprising in response to the selection, providing a preview page that includes a preview of the syndication feed.

16. The system of claim 10, further comprising in response to the selection, providing a field window that includes a preview of the syndication feed.

17. The system of claim 16, wherein a preview of the syndication feed comprises XML source code of the syndication feed.

18. The system of claim 10, wherein the syndication option includes a user selectable screen button configured to initiate the subscription.

19. Computer readable media comprising program code that when executed by a programmable processor causes the processor to perform a method for responding to a query, the method comprising:

receiving, in a general-purpose search engine, the query from a user including a plurality of search terms;

generating, in response to the search terms, a list of one or more hits, each hit referencing a target page or site, the list of one or more hits capable of including each of one or more hits with an associated syndication feed and one or more hits without an associated syndication feed;

for each target page or site, detecting whether the target page or the site has an associated syndication feed;

providing the list of one or more hits capable of including each of one or more hits with an associated syndication feed and one or more hits without an associated syndication feed, including a syndication option for each target page or site that has an associated syndication feed;

providing a preview pane of syndication feeds subscribed to by the user along with the list of one or more hits;

receiving a selection of the syndication option for one of the hits from the user;

updating the preview pane of syndication feeds to include the selection of the syndication option from the user;

in response to the selection, updating a syndication content section on a personal portal page for the user to include a subscription to the syndication feed selected by the user, the personal portal page comprising content sections, other than the syndication content section, not associated with syndication feeds; and providing the personal portal page, as an alternative interface, for the user to subscribe the personal portal page to a syndication feed based on the updated personal portal page.

20. The computer readable medium of claim 19, wherein the syndication feed comprises an RSS feed.

21. The computer readable medium of claim 19, wherein the alternative interface includes a webpage or a syndication search page.

22. The computer readable medium of claim 19, wherein the client system comprising a human operated system.

23. The computer readable medium of claim 19, wherein the client system comprises a computer operated device.

24. The computer readable medium of claim 19, further comprising in response to the selection, providing a preview page that includes a preview of the syndication feed.

25. The computer readable medium of claim 24, wherein a preview of the syndication feed comprises XML source code of the syndication feed.

26. The computer readable medium of claim 19, further comprising in response to the selection, providing a field window that includes a preview of the syndication feed.

27. The computer readable medium of claim 19, wherein the syndication option includes a user selectable screen button configured to initiate the subscription.

* * * * *